United States Patent [19]

Brändli

[11] 4,349,765
[45] Sep. 14, 1982

[54] ULTRAVIOLET GENERATING DEVICE COMPRISING DISCHARGE TUBE JOINED TO TWO TUBULAR ENVELOPES

[75] Inventor: Gerold Brändli, Aarau, Switzerland

[73] Assignee: BBC Brown, Boveri & Company, Limited, Baden, Switzerland

[21] Appl. No.: 955,711

[22] Filed: Oct. 30, 1978

[30] Foreign Application Priority Data

Oct. 31, 1977 [CH] Switzerland ............................. 13198
Apr. 5, 1978 [DE] Fed. Rep. of Germany ....... 2814683

[51] Int. Cl.³ ..................... H01J 61/067; H01J 61/30
[52] U.S. Cl. ..................................... 313/220; 313/112
[58] Field of Search ............................... 313/112, 220

[56] References Cited

U.S. PATENT DOCUMENTS

| 2,272,992 | 2/1942 | Hebo | 313/112 X |
| 3,971,968 | 7/1976 | Bachman et al. | 313/220 X |
| 3,988,628 | 10/1976 | Clausen | 313/112 |
| 4,000,431 | 12/1976 | Brandli et al. | 313/220 X |
| 4,056,751 | 11/1977 | Gungle et al. | 313/220 X |
| 4,129,800 | 12/1978 | Benthem et al. | 313/220 X |

Primary Examiner—Robert Segal
Attorney, Agent, or Firm—Oblon, Fisher, Spivak, McClelland & Maier

[57] ABSTRACT

A device for generating high intensity ultraviolet radiation thermoemissively in a discharge tube filled with a mercury vapor and at least one rare gas, the discharge tube having two ends joined to two tubular envelopes housing anode and cathode electrodes, wherein the rare gas is either argon, krypton or xenon maintained at an operating pressure of between 0.01 and 0.5 Torr, and the discharge tube and the tubular envelopes consist of doped quartz glass doped such that radiation lines at 185 and 194 mm are almost completely absorbed and a radiation line at 254 nm is transmitted almost without loss, and wherein is provided on the discharge tube an appendix-like piece of tube, which is to receive condensed mercury and the temperature of which is adjustable between 48° and 65° C.

7 Claims, 5 Drawing Figures

ULTRAVIOLET GENERATING DEVICE COMPRISING DISCHARGE TUBE JOINED TO TWO TUBULAR ENVELOPES

BACKGROUND OF THE INVENTION

1. Field of the Invention

This invention relates to a device for generating ultraviolet radiation of high radiation intensity, in which the radiation can be generated thermoemissively, in a discharge tube which transmits UV radiation and is provided with a filling of mercury/rare gas and has an internal diameter of between 4 and 20 mm, by means of a gas discharge which is wall-stabilised and takes place between two electrodes under a pressure of mercury between $5 \times 10^{-3}$ and $5 \times 10^{-1}$ Torr and a pressure of rare gas between 0.01 and 10 Torr and at a current density of the discharge current of the gas discharge between 1 and 25 A/cm$^2$, the two ends of the discharge tube being joined to tubular envelopes for receiving the electrodes.

2. Description of the Prior Art

Devices of this type, called high-current low-pressure UV radiation sources, have for example been disclosed in German Offenlegungsschriffen Nos. 2,412,997 and 2,433,557. To achieve a high radiation intensity, lamps of this type are usually operated with direct current. This requires two different electrodes, namely a thermoemissive cathode, e.g. a barium oxide cathode, and an anode which receives electrons of high energy and is therefore extremely resistant to high temperatures, e.g. an anode consisting of graphite. Furthermore, since a large stream of mercury vapour must flow from the anode space to the cathode space, when the radiation source is operated at a rather small pressure difference, it is necessaery to provide a pressure-equalizing space. However, electrophoretic processes in the discharge cannot be avoided so that the radiation emission is not uniform over the entire surface of the discharge space and premature ageing of the radiation source occurs.

German Offenlegungsschrift No. 2,515,607 has disclosed a high-current mercury low-pressure lamp which has a pressure-equalizing space and in which the anode electrode and the cathode electrode are located one behind the other in an envelope, one of the two arms of the discharge space coaxially protruding into the envelope and the anode of annular shape passing through. Lamps of this type are preferably used as sources of ultraviolet radiation, for example for the sterilization of packaging materials. When these lamps are used in practice, it has been found that a direct arc-through between the cathode and anode can occur through the pressure-equalizing space and that as a result the entire lamp is destroyed under certain circumstances. The reason for this arc-through is the excessive temperature of the pressure-equalizing space, the shape of which in the known lamps is determined essentially by two parts in the shape of collars. The high temperature in the pressure-equalizing space in these lamps results from the fact that this space is heated by the radiation from the cathode. In addition, heating is effected by the anode column of the discharge.

SUMMARY OF THE INVENTION

It is an object of the present invention to provide a device of the type mentioned above which achieves a high intensity of radiation, in particular at the wavelength of 254 nm, and a radiation emission which is uniform over the entire surface, and which, furthermore, is distinguished by a long life high efficiency and simple mechanical construction.

It is another object of this invention to provide a radiation generating device which avoids an arc-through through the pressure-equalizing space and thus exhibits increased average life relative to lamps of this type.

These and other objects are achieved according to the invention by providing a device for generating ultraviolet radiation which as a result of suitably adjusting the pressure of rare gas, achieves a very high intensity of radiation, and which, when operating with alternating current, achieves a radiation emission which is uniform over the entire surface of the discharge tube due to the absence of electrophoretic processes.

When operating with alternating current, it has proved particularly advantageous that both the electrodes are thermoemissive and are largely identical with respect to the geometry, the construction and the material and that the electrodes provided are oxide cathodes manufactured with the use of powdered nickel and (Ba, Ca, Sr) carbonate or dispenser cathodes containing a sintered body of tungsten, molybdenum or tantalum and barium or a rare earth metal. The two envelopes containing the electrodes are identical with respect to their geometric dimensions and the compositions of their material and consist of the same material as the discharge tube. As a result, the entire device of the invention is symmetrical and can be manufactured particularly simply and, above all, without the use of "horse tails".

In general, it is of particular importance that the discharge tube and the envelopes consist of doped quartz glass, the doping being such that the lines at 185 and 194 nm are almost completely absorbed and the line at 254 nm is transmitted almost without loss. The undesirable ozonization of the air, otherwise caused by the absorbed lines, is thus almost completely suppressed whereas the desired sterilization, effected by the transmitted line, can be utilized to the full extent.

In general, the discharge tube is filled with an inert gas, such as xenon, as well as mercury and it is also important that the pressure of the xenon is between 0.04 and 0.1 Torr. Precisely in this pressure range, xenon has similar properties as mercury at 55° C. with respect to the discharge behavior. The device according to the invention can then be started cold and/or without a stand-by circuit and can be brought to full power extremely rapidly. An appendix-like piece of tube, which is to receive the mercury and the temperature of which is adjustable between 48° and 65° C., is provided on the discharge tube, which enables regulation of the vapour pressure of mercury and hence the entire device with particular ease in respect of the emitted intensity of radiation.

In a preferred embodiment of the device according to the invention, it is advisable to select the dimensions in such a way that the internal diameter of the discharge tube is between 8 and 15 mm, whilst the diameter of the appendix-like piece of tube is 0.3–1 times the diameter of the discharge tube and the diameter of the envelopes is 1–4 times the diameter of the discharge tube, and that, moreover, the length of the discharge tube is between 0.8 and 2 m, whilst the length of the appendix-like piece of tube is 0.005–0.1 times the length of the discharge tube and the volume of the envelopes is 0.5–4 times the volume of the discharge tube.

Furthermore, it is extremely convenient in practice to shape the discharge tube in the shape of a U or the shape of a folded U, that is to say at least 4 parallel tubes connected like a meander.

Since the pressure-equalizing tube is dispensed with when operating with alternating current, it is also possible for the discharge tube to be straight or to have an elongated shape. A device of such a shape is particularly inexpensive and simple to manufacture.

A considerable simplification of manufacture and hence also a reduction in the cost of the device is also obtained when the electrodes are brought out of the envelopes via small molybdenum plates, since in such a design of the device according to the invention the "horse tails" which are otherwise necessary are dispensed with.

Furthermore, it is important that, in the design which is operated with direct current and which has pressure equalization and electrodes which are arranged one behind the other in coaxial envelopes, the first envelope which protrudes into the other envelope extends at least up to the cathode and laterally surrounds the latter.

Two objectives are achieved by this measure. On the one hand, a substantial part of the pressure-equalizing space is displaced into the cold zone of the cathode space and thus makes better cooling possible. On the other hand, this construction enables the pressure-equalizing space to be longer than in known lamps (for the influence of the length of the pressure-equalizing space on the arc-through, also compare Swiss Patent Specification No. 578,250).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
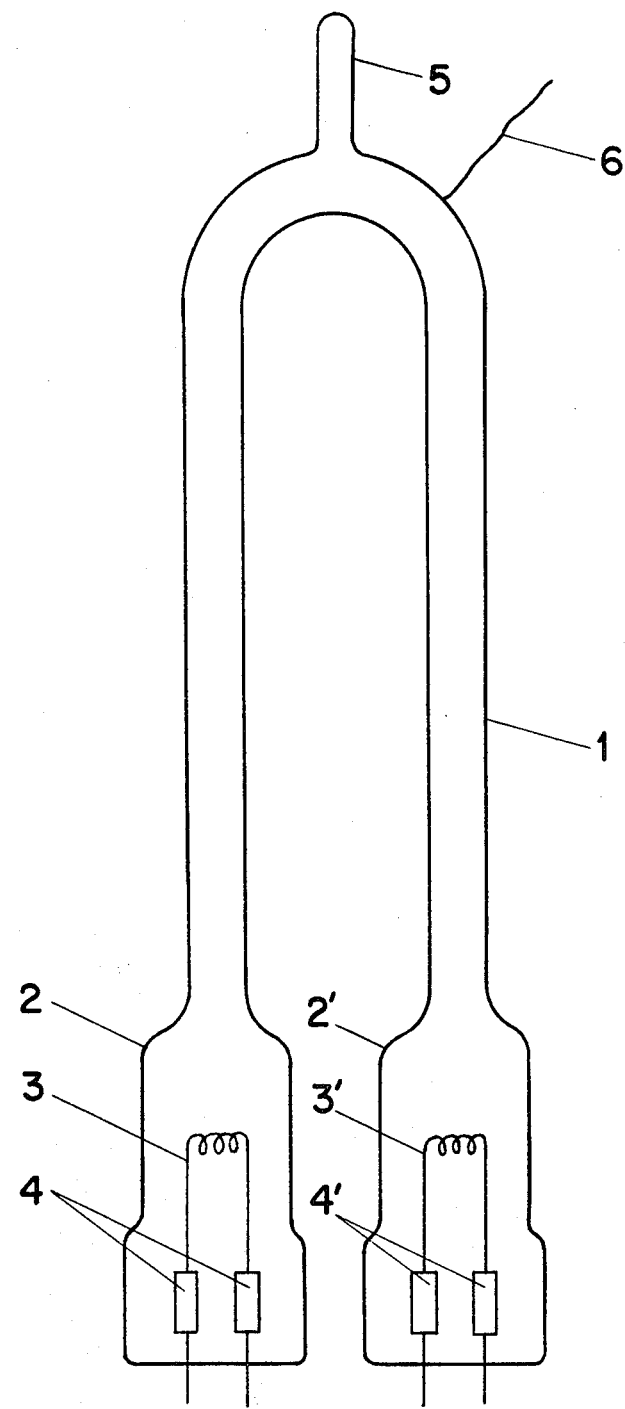
FIG. 1 is a schematic illustration of a device according to the invention, to be operated with alternating current, for generating ultraviolet radiation using a discharge tube bent in the shape of a U.

Referring now to the drawings, wherein like reference numerals designate identical or corresponding parts throughout the several views, and more particularly to FIG. 1 thereof, there is seen a discharge tube 1 which is bent in the shape of a U and the two ends of which are fitted, respectively, with a cylindrical envelope 2 or 2', in which an electrode 3 or 3' is located in each case, which is conducted to the outside via bushings 4 or 4'. An appendix-like piece of tube 5, which is to receive mercury which is not shown in the figure, is located at the center of the bent zone of the discharge tube 1. The discharge tube 1, including the two envelopes 2 and 2' as well as the appendix-like piece of tube 5, consists of quartz glass which is doped in such a way that the ozone-producing lines of mercury at 185 and 194 nm are absorbed, but the sterilizing line at 254 nm is transmitted virtually without absorption losses. A suitable glass is titanium-doped quartz glass which is sold, for example, by Messrs. Heraeus, Hanau (Federal Republic of Germany) under the name M 68 or by Messrs. "Quartz et Silice", 8 rue d'Anjou, Paris, under the name "Germisil". The electrical bushings 4, 4' are small molybdenum plates which are passed into the quartz glass of the envelopes 2, 2'. The reference numeral 6 designates a wire which is in contact with the discharge tube 1 and which, after pulses of about 20 kV have been applied thereof, effects the starting of the discharge tube 1 when the latter is ready for operation. This wire can, at the same time, be used as a holder for the discharge tube.

The discharge tube 1 has an approximately circular cross-section and preferably has an internal diameter between 8 and 15 mm and a length between 0.8 and 2 mm. Preferably, the two envelopes 2, 2' have an internal diameter which is 1–4 times greater than that of the discharge tube 1, and have a volume which is 0.5–4 times that of the discharge tube 1. Preferably, the appendix-like piece of tube 5 has a length between 10 and 50 mm and an internal diameter which is 0.3–1 times the internal diameter of the discharge tube 1.

Figure 4:
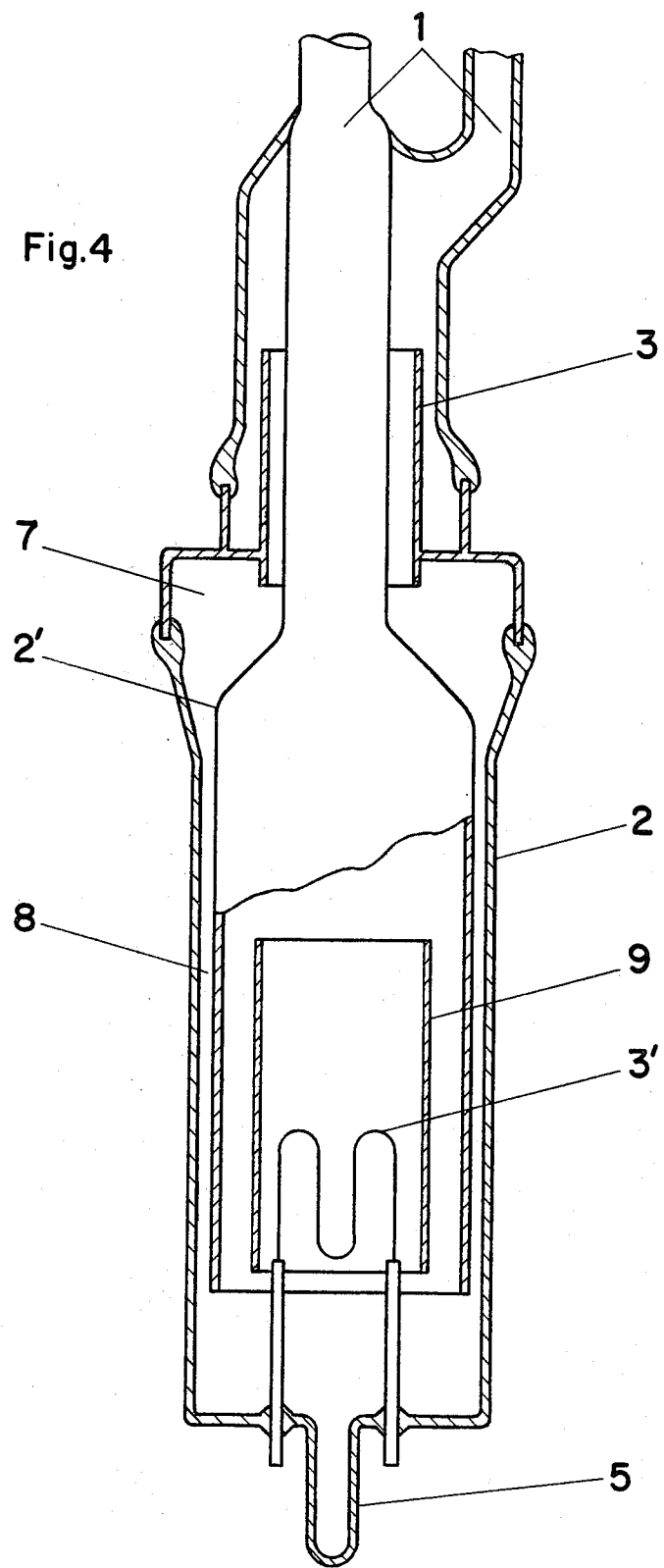
FIG. 4 is a schematic illustration of a device according to the invention, to be operated with direct current and with pressure equalization, and includes a detailed view of the envelope; and, FIG. 5 is an overall view of the device of FIG. 4.

The shape and the construction of the electrodes 3, 3' essentially corresponds to the shape and the construction of the thermoemissive cathode according to German Offenlegungsschrift No. 2,433,557, see in particular the explanations relating to FIG. 4. Moreover, however, oxide cathodes manufactured with the use of powdered nickel and (Ba, Ca, Sr) carbonate or dispenser cathodes containing a sintered body of tungsten, molybdenum or tantalum and barium or a rare earth metal have also proven very suitable.

Figure 2:
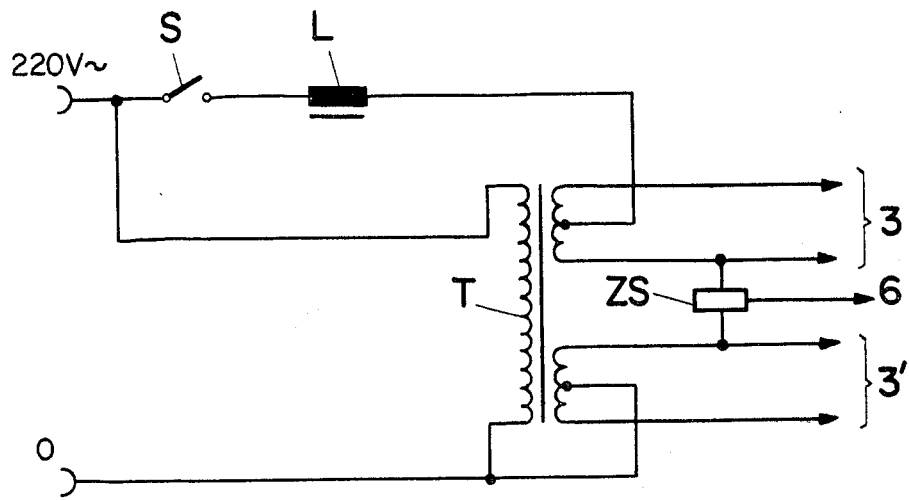
FIG. 2 is a schematic circuit diagram illustrating the current supply to the device according to FIG. 1.

The current supply to the device according to the invention can be seen from the circuit arrangement according to FIG. 2. In this arrangement, the primary side of an electrode-heating transformer T is connected to a source of 220 V alternating voltage. A part of the secondary winding serves to heat the electrode 3 and another part serves to heat the electrode 3'. A starting circuit ZS is supplied in parallel to two current leads of the two electrodes 3 and 3'. One secondary winding of the heating transformer T, supplying current to the electrode 3, is connected via a current-limiting inductor L and a switch S to one pole of the voltage source, whilst the other secondary winding of the heating transformer T, supplying current to the electrode 3', is short-circuited to the other pole of the voltage source. Using this arrangement, it is possible to operate the device according to the invention with simple means and without the use of rectifiers, which is otherwise customary.

The filling gases used are argon, krypton and/or xenon as well as mercury which is accommodated in excess in the liquid form in the appendix-like piece of tube 5. The temperature of the mercury and hence the pressure of the mercury are adjusted by heating the appendix-like piece of tube to temperatures between 48° and 65° C.

Figure 3:
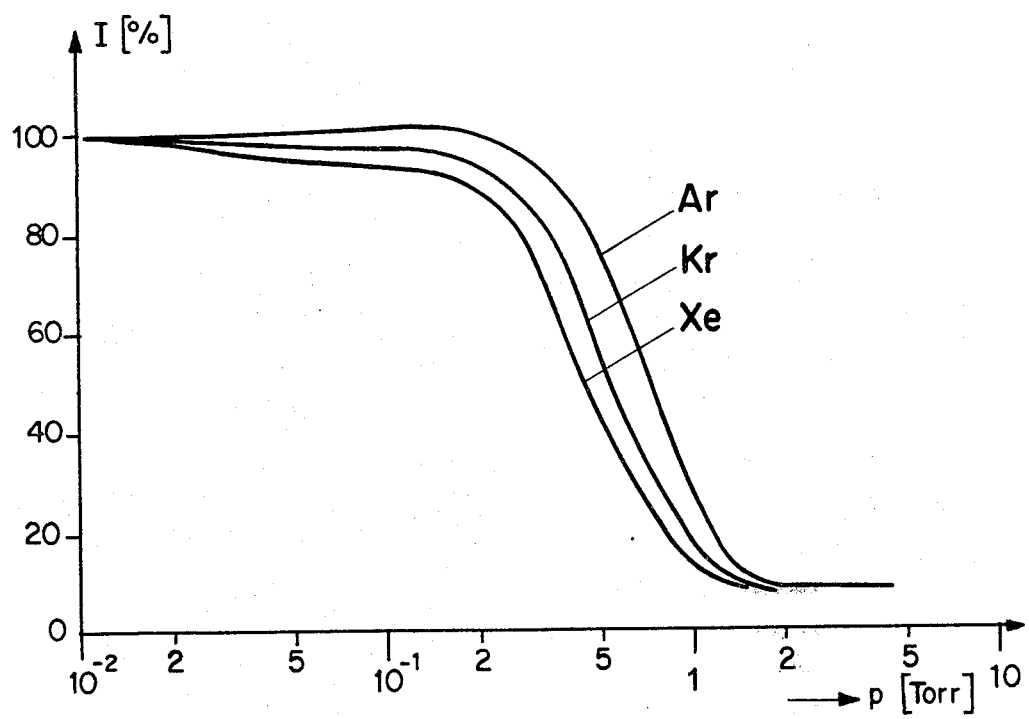
FIG. 3 is a graph illustrating the relative UV yield I of a device according to FIG. 1, as a function of the pressure p of the device rare gas.

According to FIG. 3, where the UV yield of the device according to the invention in the range of the wavelength of 254 nm is plotted as a function of the rare gas pressure, Torr, of the filling gas used, it can be seen that the UV yield of UV lamps according to the invention is more than 50% of the maximum UV yield in the case of fillings of argon, krypton or xenon in the range between 0.01 and 0.5 Torr, and the desired high intensity of radiation at the wavelength of 254 nm is thus reached in this pressure range without difficulty. Furthermore, it has proven very advantageous to adjust the xenon pressure to a value between 0.04 and 0.1 Torr since xenon in this pressure range exhibits properties during the electrical discharge, which are similar to those of mercury at 55° C., in particular with respect to the ionization potential.

All the curves of FIG. 3 were measured on a discharge tube of about 10 mm internal diameter, under a mercury pressure corresponding to a condensate temperature of 55° C. and at a current density of 5 A/cm$^2$.

Instead of merely limiting the current density to 5 A/cm$^2$, it is advantageous, depending on the shape and dimensions of the lamps according to the invention, to set the current density between 3 and 10 A/cm$^2$ and to set the arc voltage between 0.3 and 1.2 V/cm$^2$.

FIG. 4 shows an envelope 2 which essentially consists of heat-resistant hard glass and in which the two electrodes, that is to say the cathode 3' and the anode 3, are located one behind the other. In addition to the actual heating coil, the cathode 3' also has a cylindrical radiation shield 9 which is to prevent a radiation of heat to the side. The discharge tube 1 consists of two arms which are both connected to the same end of the envelope 2. The arm, which ends in the envelope 2', here coaxially protrudes into the envelope 2, passes through the anode 3 of annular shape and, at a corresponding widening in the anode region 7, surrounds the cathode 3'.

Figure 5:
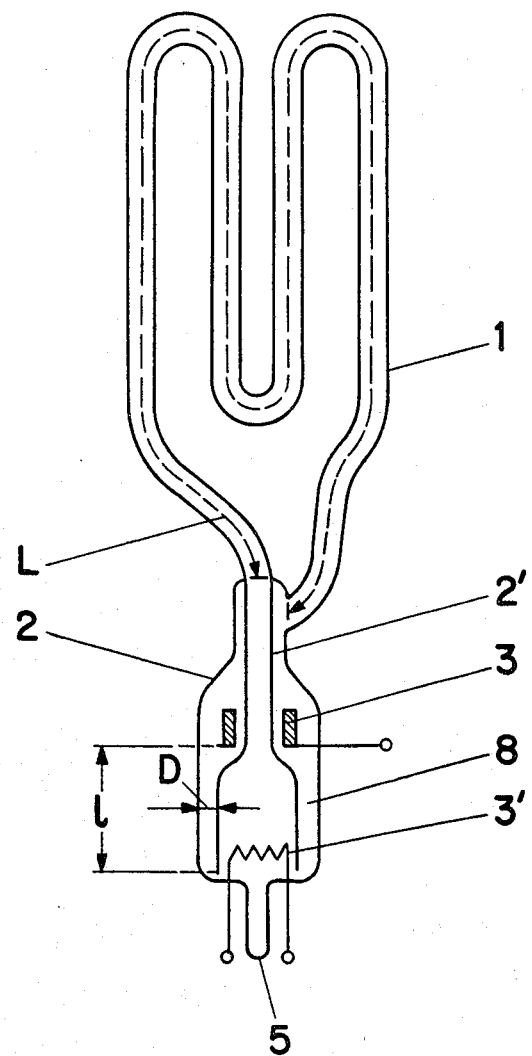

The pressure-equalizing space 8 between the walls of the envelopes 2 and 2' forms, over the entire length, a zone which is extremely rigid and protected against arc-through and which, in addition, also makes possible a sufficient flow of gas/vapor for the pressure equalization between the anode part and the cathode part, if the distance D is not less than 0.5 mm. The distance D is defined as the distance between the walls of the envelopes 2 and 2' as shown in FIG. 5. This distance is measured in the region founded by the lower edge of the anode 3 and the lower edge of the envelope 2'. In the case of distances D which are greater than 4 mm, arc-through can occur. In these cases, the cathode 3' should be located farther in the interior of the envelope 2', since the path between the anode and cathode via the pressure-equalizing space then becomes longer, and this likewise counteracts a possible arc-through. Radiation sources having a distance D of 1 mm have proved particularly suitable.

In order to ensure trouble-free operation of the radiation source, the length of the envelope 2' protruding into the envelope 2, measured between the lower edge of the anode 3 and the lower edge of the envelope 2', should be about 1/5 to 1/20, preferably 1/10, of the length of the entire discharge tube located outside the envelope 2. FIG. 5 reproduces the lengths in a lamp having a discharge space in the form of a meander.

The new construction is easy to manufacture and has proved to be the best solution for all types of lamps with a single envelope, operated with direct current.

Preferred operating data are: pressure of rare gas, $2-5 = 10^{-2}$ Torr; current density, 4–8 A/cm$^2$; Hg temperature in the appendix-like piece of tube 5, 50°–60° C.;
voltage drop over the discharge length, 1 V/cm±0.2. The appendix-like piece of tube has a length of 3–6 cm coupled with an internal diameter of 10 mm.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a device for generating ultraviolet radiation of high radiation intensity, in which the radiation can be generated thermoemissively, in a discharge tube filled with mercury and at least one rare gas and having an internal diameter of between 4 and 20 mm, said discharge tube transmitting UV radiation by means of a gas discharge which is wall-stabilized and takes place between two electrodes under a pressure of mercury between $5 \times 10^{-3}$ and $5 \times 10^{-1}$ Torr and a pressure of rare gas between 0.01 and 10 Torr and at a current density of the discharge current of the gas discharge between 1 and 25 A/cm$^2$, the two ends of the discharge tube being joined to two tubular envelopes for receiving the electrodes, the improvement comprising:

said at least one rare gas comprising a gas from the group consisting of argon, krypton and xenon under a gas pressure (p) which, in the operating state of the device, is between 0.01 and 0.5 Torr;

the discharge tube and the envelopes comprising doped quartz glass, the doping of which is such that radiation lines at 185 and 195 nm are almost completely absorbed and a radiation line at 254 nm is transmitted almost without loss; and, an appendix-like piece of tube, which is to receive condensed mercury and the temperature of which is adjustable between 48° and 65° C., provided on the discharge tube wherein the internal diameter of the discharge tube is between 8 and 15 mm; the diameter of the appendix-like piece of tube is 0.3–1 times the diameter of the discharge tube; the diameters of the envelopes are 1–4 times the diameter of the discharge tube; the length of the discharge tube is between 0.8 and 2 m; the length of the appendix-like piece of tube is 0.005–0.1 times the length of the discharge tube; and the volume of the envelopes is 0.5–4 times the volume of the discharge tube.

2. A device according to claim 1, in which said electrodes between which said gas discharge takes place comprise:

two thermoemissive electrodes which are largely identical with respect to their geometric dimensions, construction and composition of material and to which an alternating current can be applied, said electrodes designed as oxide cathodes and composed of powdered nickel and a carbonate selected from the group consisting of BaCO$_3$, Ca CO$_3$ and Sr CO$_3$.

3. A device according to claim 1, in which said electrodes between which said gas discharge takes place comprise:

two thermoemissive electrodes which are largely identical with respect to their geometric dimensions, construction and composition of material and to which an alternating current can be applied, said electrodes designed as dispenser cathodes and composed of a sintered body comprising a first element selected from the group consisting of tungsten, molybdenum and tantalum and a second element selected from the group consisting of barium and a rare earth metal.

4. A device according to claim 1, wherein said at least one rare gas comprises xenon, further comprising:
said xenon maintained at a pressure between 0.04 and 0.1 Torr.

5. Device according to one of claims 2 or 3 further comprising;
small molybdenum plates by means of which the electrodes are brought out of the envelopes.

6. A device according to claims 2 or 3, wherein:
the two envelopes are identical with respect to their geometric dimensions and the compositions of their material and consist of the same material as the discharge tube.

7. A device according to claims 2 or 3, further comprising:
a wire provided in contact with the outside of the discharge tube and to which pulses of about 20 kV can be applied.

* * * * *